June 23, 1936.  G. G. LANDIS  2,044,798
ALTERNATING CURRENT ARC WELDING
Filed Jan. 28, 1935  3 Sheets—Sheet 1
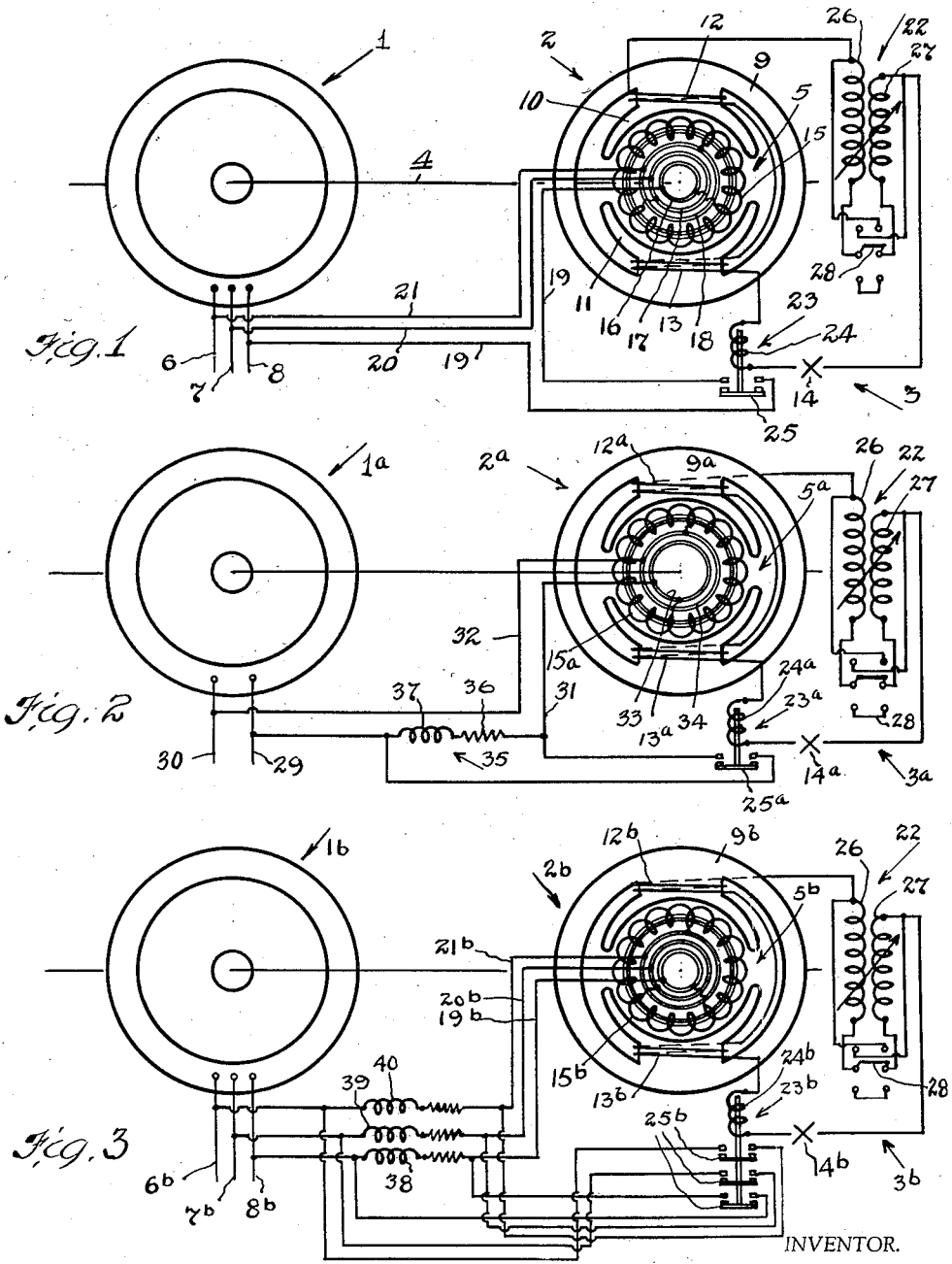
INVENTOR.
George G. Landis
BY Fay, Oberlin & Fay
ATTORNEYS.

INVENTOR.
George G. Landis
BY
Fay, Oberlin & Fay
ATTORNEYS.

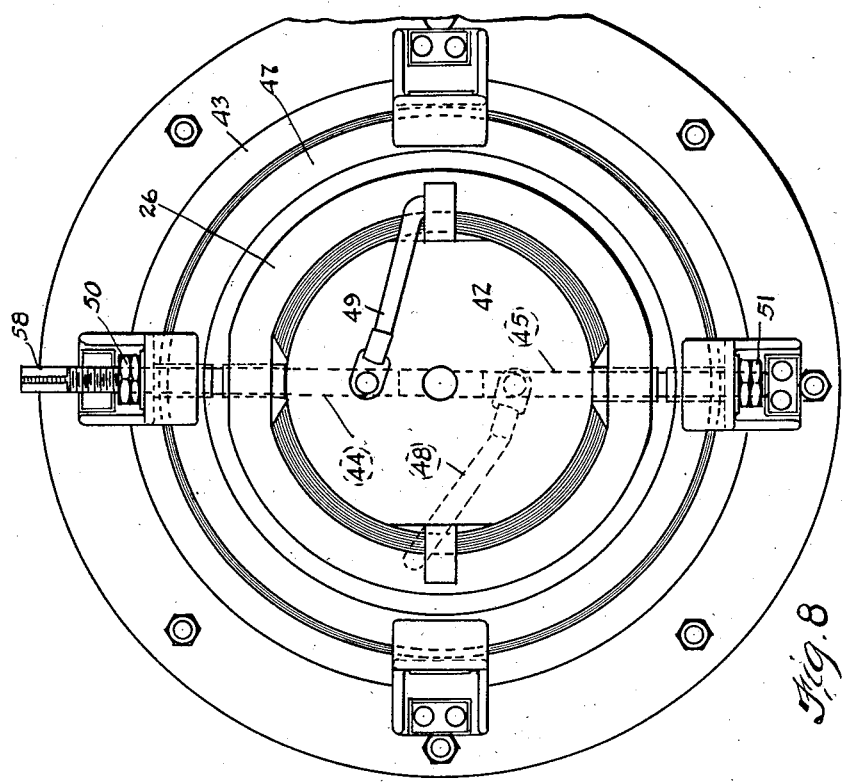
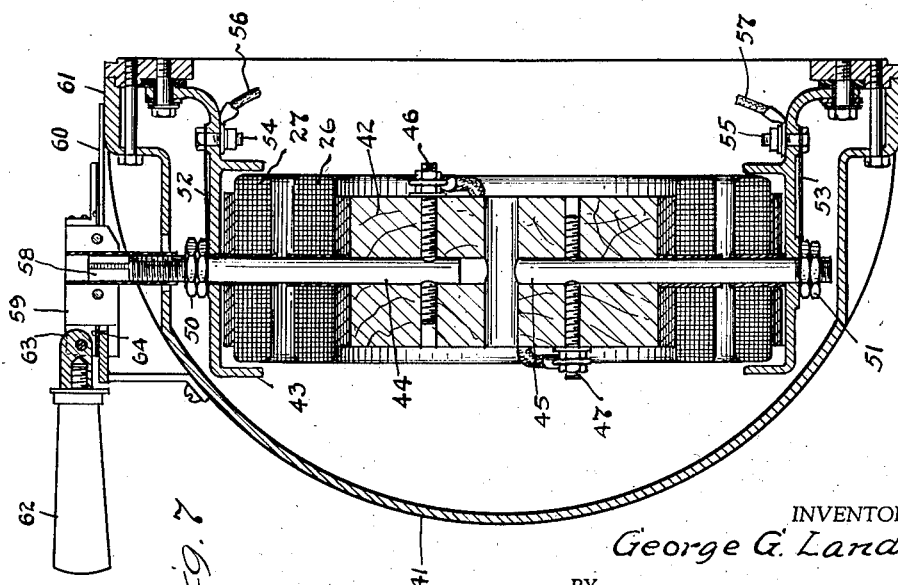

Patented June 23, 1936

2,044,798

UNITED STATES PATENT OFFICE 2,044,798

ALTERNATING CURRENT ARC WELDING

George G. Landis, University Heights, Ohio, assignor to The Lincoln Electric Company, Cleveland, Ohio, a corporation of Ohio Application January 28, 1935, Serial No. 3,823

5 Claims. (Cl. 219—8)

This application is a continuation in part of my co-pending application Serial No. 737,436, filed January 28, 1934.

This invention relates as indicated to the art of welding by means of alternating current and pertains more particularly to an improved apparatus whereby commercially available alternating current may be converted into such form as to be best suited for the purpose of carrying on the arc welding operation and by means having improved performance characteristics.

It is a further object of my invention to provide an apparatus of the character described which will materially reduce the power consumption, especially during the interval when the welding arc is not actually maintained.

It is a further object of my invention to provide an apparatus of the character described in which the open circuit voltage is appreciably lower than in previously available apparatus, so that the user of the apparatus is very greatly protected from injury due to accidental contact with the welding electrode while manipulating the same and while no arc is being maintained.

It is a further object of my invention to provide a novel means for controlling the characteristics of the welding circuit so as to provide a wide range of adjustment thereof and which adjustment may be made at a uniform rate.

To the accomplishment of the foregoing and related ends, said invention, then consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:—

Figure 4:
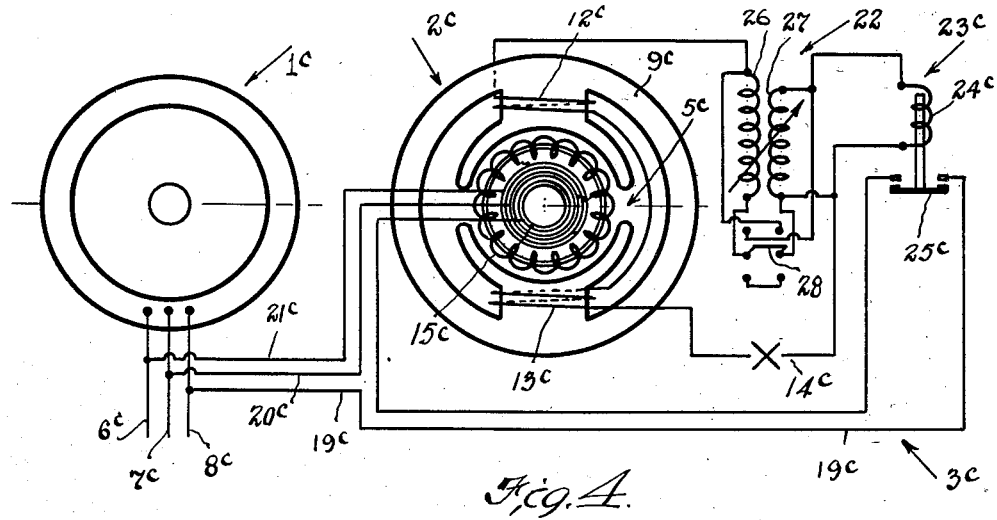
Figure 5:
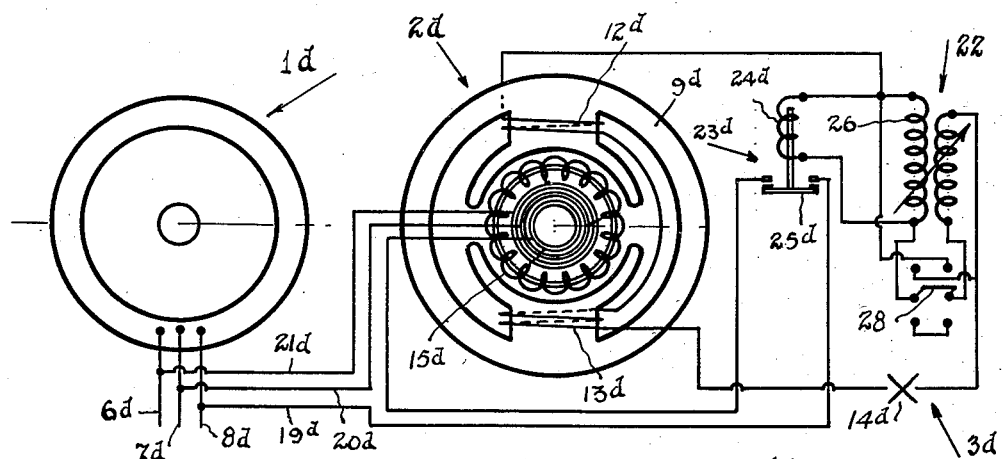
Figure 6:
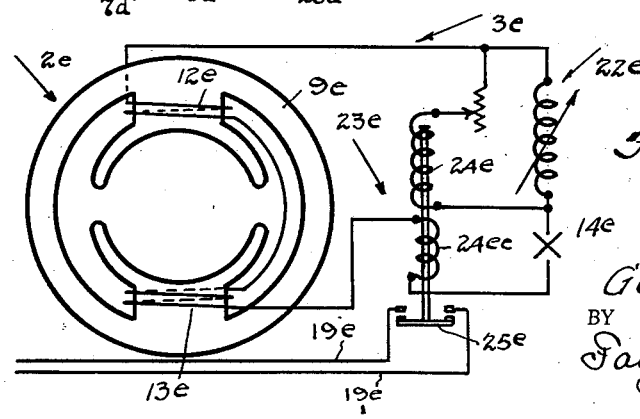

Fig. 1 is a schematic diagram of one form of apparatus arranged in accordance with the principles of my invention and adapted to convert polyphase alternating current to single phase welding current; Fig. 2 is a schematic diagram of an apparatus similar to that illustrated in Fig. 1 but arranged to convert single phase alternating current to single phase welding current of different characteristics; Fig. 3 is a schematic diagram of an apparatus similar to Fig. 1 but showing an alternative form of control means for automatically reducing the energization of the converter when the arc is broken; Figs. 4, 5 and 6 are likewise views similar to Fig. 1 but showing alternative forms of the control means comprising one feature of the present invention; Fig. 7 is a transverse sectional view of the variable reactor which is a part of the apparatus illustrated in the previous figures and Fig. 8 is a side elevational view of a portion of the apparatus illustrated in Fig. 7.

Referring now more specifically to the drawings and more especially to Fig. 1, the apparatus herein disclosed is generally similar to that disclosed in my above identified co-pending application and includes a polyphase alternating current motor generally indicated at 1, a phase frequency converter, generally indicated at 2 and an external welding circuit, generally indicated at 3. The motor 1 is preferably mechanically connected by means such as the shaft 4 to the rotor 5 of the converter 2.

A polyphase supply circuit including leads 6, 7 and 8 are connected to the motor for the purpose of driving the same and, of course, conventional control means such as switches, variable resistances, etc., not shown, may be included in the power circuit to the motor 1 for the purpose of varying its operating characteristics.

The phase frequency converter 2 comprises a frame 9, which is provided with pole pieces 10 and 11 upon which are mounted windings 12 and 13 which are in series with each other and suitable electrodes, not shown, between which a welding arc conventionally represented at 14 may be maintained.

The rotor unit 5 of the converter 2 comprises a winding 15 which, at spaced points, is connected with slip rings 16, 17 and 18. The brushes which have contact with the slip rings 16, 17 and 18 are respectively connected by means of leads 19, 20 and 21 to the main supply lines 8, 7 and 6.

A variable reactor, generally indicated at 22, is connected in series wth the welding arc 14 and a relay, generally indicated at 23, provided with an operating coil 24 is utilized to actuate a switch, generally indicated at 25 which is connected in series with the lead 19.

The variable reactor comprises two windings 26 and 27 which respectively have a different number of turns and are so connected to a double throw switch that when the lever 28 of such switch is in a downward position, the windings 26 and 27 will be connected in series and when in the upward position, such windings will be connected in parallel. The construction and mode of operation of the variometer 22 will be more fully explained in connection with the description of Figs. 7 and 8 which illustrate the mechanical construction of such variometer.

The operation of the above described form of apparatus is briefly as follows:—

When it is desired to commence the arc welding operation, the motor 1 will, of course, first be started by any suitable means so as to drive the rotor 5 of the converter 2. Since no current is flowing as yet in the arc circuit, the switch 25 will be open and, therefore, one phase of the winding on the rotor 5 will be deenergized. As soon as the arc is struck and current flows in the welding circuit, the winding 24 of the relay 23 will be energized closing the switch 25 and consequently, the circuit through the lead 19 and hence, the windings of the rotor 5, will be immediately fully energized. The above described apparatus which results in a substantial deenergization of the windings of the rotor 5 results in the following particular advantages:—Substantial deenergization of the rotor 5 results in an appreciable reduction in the no-load power consumption of the apparatus as a whole. The partial deenergization of the rotor 5 also results in a reduction in the open circuit voltage at the arc. In other words, in apparatus, as provided by the prior art, the normal open circuit voltage of the apparatus is usually approximately twice the voltage across the arc so that there is considerable danger in handling an electrode connected in such high voltage circuit; however, in accordance with the present invention, the open circuit voltage may be reduced to any desired extent, preferably substantially the voltage across the arc so that such danger is, in a large measure, eliminated.

At this point it may be well to note that if it were not for the purpose of fully protecting the operator from being required to handle an electrode connected in a relatively high voltage circuit, it might be desirable to provide the relay 23 with a time delay means such as a dash-pot or the like which would prevent the switch 25 from opening the lead 19 until after the expiration of a predetermined time interval after the arc is broken. If such time delay were provided, the operator might quickly break and re-strike the arc during the welding operation, which sometimes occurs without in any way affecting the operation of the machine by the tripping out of the relay 23. However, as previously explained, it is desired by means of the present apparatus to provide as full protection as possible to the operator, in which case such time delay on the relay 23 is intentionally omitted and so that the open circuit voltage is, after the arc is broken, immediately reduced to a low value.

The apparatus illustrated in Fig. 2 is substantially identical with that shown in Fig. 1 with the exception that a single phase alternating current supply from lines 29 and 30 is utilized to drive the motor 1a and only a single pair of leads 31 and 32 connect such single phase supply line to two slip rings 33 and 34 in the converter 2a. When a single phase supply is utilized, it is not feasible to open one of the supply lines 31 or 32 when the arc is broken for the reason that this would completely deenergize the rotor 5a and make it impossible to again re-strike the arc. The relay 23a is, therefore, connected across an impedance, generally indicated at 35, which preferably comprises a resistance 36 and a reactance 37 connected in series. It is within the contemplation of my invention to, of course, incorporate the separate elements of the impedance in one winding and to make the same variable.

The variable reactor employed in conjunction with the apparatus illustrated in Fig. 2 is shown as identical with that described in connection with the description of Fig. 1 and accordingly similar reference characters will be employed to designate like parts.

The arrangement illustrated in Fig. 3 may be generally stated as the application of the type of control of Fig. 2 to a three-phase supply system such as is illustrated in Fig. 1. In other words, in Fig. 3, instead of opening one phase of the supply to the rotor 5b, impedances generally indicated at 38, 39 and 40 are inserted in series with the leads 19b, 20b and 21b and the relay 23b is provided with three switches 25b which respectively short circuit the impedances 38, 39 and 40 when the relay 23b is energized by current flow in the arc. The impedances 38, 39 and 40 may be combined and rendered variable in the manner described in connection with the impedance 35.

The reactor 22 associated with the apparatus illustrated in Fig. 3 is substantially identical with that illustrated in Figs. 1 and 2 and accordingly like reference characters will be employed to designate like parts.

The arrangement illustrated in Fig. 4 is generally similar to that illustrated in Fig. 1, change being made, however, in the manner in which the relay in the lead 19c is energized. In Fig. 4 the relay 23c or more particularly, the winding 24c thereof, instead of being connected in series with the arc, is connected in parallel with the winding 27 of the variometer 22. In every other respect, the apparatus illustrated in Fig. 4 is similar to that illustrated in Fig. 1, so that like reference characters will be employed to designate like parts.

The arrangement illustrated in Fig. 5 differs from that illustrated in Fig. 4 in that the winding 24d of the relay 23d is connected across the other winding 26 of the variometer 22. Similar reference characters will, therefore, be employed to designate the remaining like parts.

In Fig. 6, only so much of the system illustrated in the previous figures, i. e., the arc circuit is illustrated. The system illustrated in Fig. 6 may be briefly described as a combination of the arrangement illustrated in Fig. 1 and the arrangement illustrated in either of Figs. 4 or 5, i. e., the relay 23e has two windings 24e and 24ee, respectively corresponding to either of the windings 24c or 24d in Figs. 4 and 5 and the winding 24 in Fig. 1. The switch 25e again controls the circuit through the lead 19e to partially deenergize the rotor windings of the converter 2e.

In connection with the foregoing description, it should be noted that while in Figs. 4, 5 and 6, a three-phase supply has been shown for the converter 2, and the rotor windings of such converter partially deenergized by an opening of one phase of such supply, it is nevertheless within the contemplation of my invention to utilize the arrangements illustrated in Figs. 4, 5 and 6 for the purpose of opening one phase of the rotor winding or to insert in series with such winding impedances such as illustrated in Figs. 2 and 3, depending upon whether the rotor is energized from a single or polyphase supply circuit. It should also be noted that the winding 24e shown in Fig. 6 may be connected across the variometer 22 in either manner as illustrated in Figs. 4 and 5.

The mechanical construction of the variometer 22, illustrated in and described in connection with Figs. 1 to 6, is shown in Figs. 7 and 8. The variometer may be conveniently mounted in the substantially hemispherical end plate 41 of the frame or housing within which the motor 1 and the converter 2 are conveniently supported. The two windings 26 and 27 of the variometer connected in the arc circuit in the manner previously explained are respectively arranged as inner and outer annular coils, the former being supported upon a movable block 42 and the latter in an annular housing 43. The block 42 and its associated inner winding 26 may be conveniently rotatably supported by means including movable contacts through which the winding 26 may be connected in the circuit in the following manner:—Spindles 44 and 45 of electrically conductive material extend into the block 42 from diametrically opposite points and in electrical communication with such blocks, at their inner ends, are binding posts 46 and 47 to which are secured leads 48 and 49 from the opposite ends of the winding 26. Where the spindles 44 and 45 pass through the annular frame 43, they are provided with jamb nuts 50 and 51 maintaining the parts in proper assembled relation. Positioned beneath the jamb nuts 50 and 51 are flexible contact strips 52 and 53 respectively secured to binding posts 54 and 55. The leads 56 and 57 connected to the binding posts 54 and 55 are those which connect the coil 26 in the circuits previously illustrated. Suitable leads, not shown, may be brought out from the opposite ends of the winding 27 whereby the same may likewise be connected in the circuits illustrated in the previous statements.

The upper end of the spindle 44 is splined as at 58 to receive an operating handle assembly, generally indicated at 59. The assembly 59 includes a pointer 60 which may register with indicia formed on the housing at 61 denoting the setting of the variometer. The assembly 59 is provided with a pivotally supported handle 62 which is eccentrically mounted so that the cam face 63 thereof will be forced into locking engagement with the ring 64 when the handle is moved to a vertical position so as to maintain the coils 26 and 27 in the selected relation.

At this point it should be noted that the windings 26 and 27 of the variometer 22 are preferably constructed from stranded conductors each having a relatively large number of strands of small diameter wires. A variometer which has been found to produce very desirable results, is formed of conductors having 2646 strands of #34 B & S gauge copper wire. Each coil will have a sufficient number of turns of such stranded conductors, (from about 18 to about 24 turns for a 300 ampere 240 cycle variometer) which permits elimination of an iron core and gives better welding characteristics because of the reduction in the amount of or the entire elimination of the iron core.

Other modes of applying the principle of my invention may be employed instead of the one explained, change being made as regards the means herein disclosed, provided those stated by any of the following claims or their equivalent be employed.

I, therefore, particularly point out and distinctly claim as my invention:

1. In an electric arc welding apparatus, the combination of means for converting polyphase alternating current to single phase alternating welding current, said means including relatively rotatable rotor and stator windings, one of said windings being connected in series with the arc and the other winding being connected across a polyphase alternating current supply line, and means functionally responsive to making and breaking of the welding arc for varying the phase energization of said last-named winding.

2. In an electric arc welding apparatus, the combination of means for converting polyphase alternating current at a given frequency to single phase alternating welding current at a different frequency, said means including relatively rotatable rotor and stator windings, one of said windings being connected in series with the arc and the other winding being connected across a polyphase alternating current supply line, and means functionally responsive to variations in the amount of welding current flow for varying the phase energization of said last-named winding.

3. In an electric arc welding apparatus, the combination of means for converting three phase alternating current at a given frequency to single phase alternating welding current at a different frequency, said means including relatively rotatable rotor and stator windings, one of said windings being connected in series with the arc and the other winding being connected across a three phase alternating current supply line, and means functionally responsive to a making and breaking of the welding arc for varying the phase energization of said last-named winding from said three phase supply.

4. In an electric arc welding apparatus, the combination of means for converting alternating current of particular characteristics to alternating welding current having different characteristics, said last-named means including relatively rotatable rotor and stator windings, one of said windings being connected in series with the arc and the other winding being connected across a polyphase alternating current supply line, and a relay functionally responsive to variations in the voltage and current characteristics of the welding circuit for varying the phase energization of said last-named winding.

5. In an electric arc welding apparatus, the combination of means for converting polyphase alternating current at a given frequency to single phase alternating welding current at a different frequency, said last-named means including relatively rotatable rotor and stator windings, one of said windings being connected in series with the arc and the other winding being connected across a polyphase alternating current supply line, and a relay functionally responsive to the amount of current flow in the welding circuit for varying the phase energization of said last-named winding.

GEORGE G. LANDIS.